(12) United States Patent
Ha

(10) Patent No.: US 12,124,047 B2
(45) Date of Patent: Oct. 22, 2024

(54) OPTICAL DEVICE FOR AUGMENTED REALITY CAPABLE OF PROVIDING IMAGE FOR AUGMENTED REALITY HAVING CLOSE DISTANCE

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 608 days.

(21) Appl. No.: 17/429,238

(22) PCT Filed: Oct. 17, 2019

(86) PCT No.: PCT/KR2019/013628
§ 371 (c)(1),
(2) Date: Aug. 6, 2021

(87) PCT Pub. No.: WO2020/166785
PCT Pub. Date: Aug. 20, 2020

(65) Prior Publication Data
US 2022/0137422 A1    May 5, 2022

(30) Foreign Application Priority Data
Feb. 13, 2019  (KR) .................. 10-2019-0016903

(51) Int. Cl.
G02B 27/09 (2006.01)
G02B 27/00 (2006.01)
G02B 27/01 (2006.01)

(52) U.S. Cl.
CPC ..... *G02B 27/0977* (2013.01); *G02B 27/0093* (2013.01); *G02B 27/0172* (2013.01)

(58) Field of Classification Search
CPC .. G02B 27/01; G02B 27/017; G02B 27/0101; G02B 27/0172; G02B 27/0977;
(Continued)

(56) References Cited

U.S. PATENT DOCUMENTS 8,294,994 B1   10/2012  Kelly
8,305,297 B2 *  11/2012  Sugihara ............ G02B 27/0172
                                                          348/56
(Continued)

FOREIGN PATENT DOCUMENTS

JP    2015-072438 A    4/2015
JP    2018-132602 A    8/2018
(Continued)

*Primary Examiner* — Sultan Chowdhury
(74) *Attorney, Agent, or Firm* — Rabin & Berdo, P.C.

(57) ABSTRACT

The present invention provides an optical device for augmented reality, the optical device including: an optical means configured to transmit at least part of image light therethrough toward the pupil of an eye of a user, and to transfer image light corresponding to an image for augmented reality to at least one optical element by reflecting the image light from the inner surface thereof at least once; and the optical element disposed inside the optical means, and configured to provide the image for augmented reality to the user by transferring the image light, corresponding to the image for augmented reality transmitted through the optical means, toward the pupil of the user; wherein the optical means includes a first surface and a second surface, and the first surface and the second surface have an inclination angle with respect to each other so as not to be parallel to each other.

7 Claims, 8 Drawing Sheets

(58) Field of Classification Search
CPC .... G02B 2027/0118; G02B 2027/0125; G02B 2027/0178
See application file for complete search history.

(56) References Cited

U.S. PATENT DOCUMENTS

| | | | |
|---|---|---|---|
| 2014/0327602 | A1 | 11/2014 | Hiraide |
| 2016/0334625 | A1* | 11/2016 | Iba ..................... G02B 27/0018 |
| 2018/0149871 | A1* | 5/2018 | Chuang ..................... G02F 1/29 |
| 2018/0275407 | A1* | 9/2018 | Choi ................. G02B 27/0172 |
| 2018/0322845 | A1* | 11/2018 | Machida ............ G02B 27/0172 |
| 2024/0177432 | A1* | 5/2024 | Ha ....................... H04N 13/322 |

FOREIGN PATENT DOCUMENTS

| | | |
|---|---|---|
| KR | 10-1660519 B1 | 9/2016 |
| KR | 10-2018-0025847 A | 3/2018 |
| KR | 10-1894556 B1 | 10/2018 |
| KR | 10-2018-0121523 A | 11/2018 |
| WO | 2014074858 A1 | 5/2014 |

* cited by examiner

OPTICAL DEVICE FOR AUGMENTED REALITY CAPABLE OF PROVIDING IMAGE FOR AUGMENTED REALITY HAVING CLOSE DISTANCE

TECHNICAL FIELD

The present invention relates to an optical device for augmented reality that can provide an image for augmented reality having a close distance, and more particularly to an optical device for augmented reality that can provide a user with a clear image for augmented reality having a close focal length other than an infinite focal length without distortion or breakage.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a technology using a configuration such as a prism capable of adjusting focal length for a virtual image and a technology for electrically controlling a variable focal lens in response to a change in focal length. However, these technologies also have a problem in that a user needs to perform a separate operation in order to adjust focal length or hardware such as a separate processor and software for controlling focal length are required.

In order to overcome the problems of the conventional technologies, the present applicant has developed an optical device capable of implementing augmented reality by projecting a virtual image on the retina through the pupil using a reflective unit having a size smaller than that of a human pupil, as described in Patent Document 1.

Figure 1:
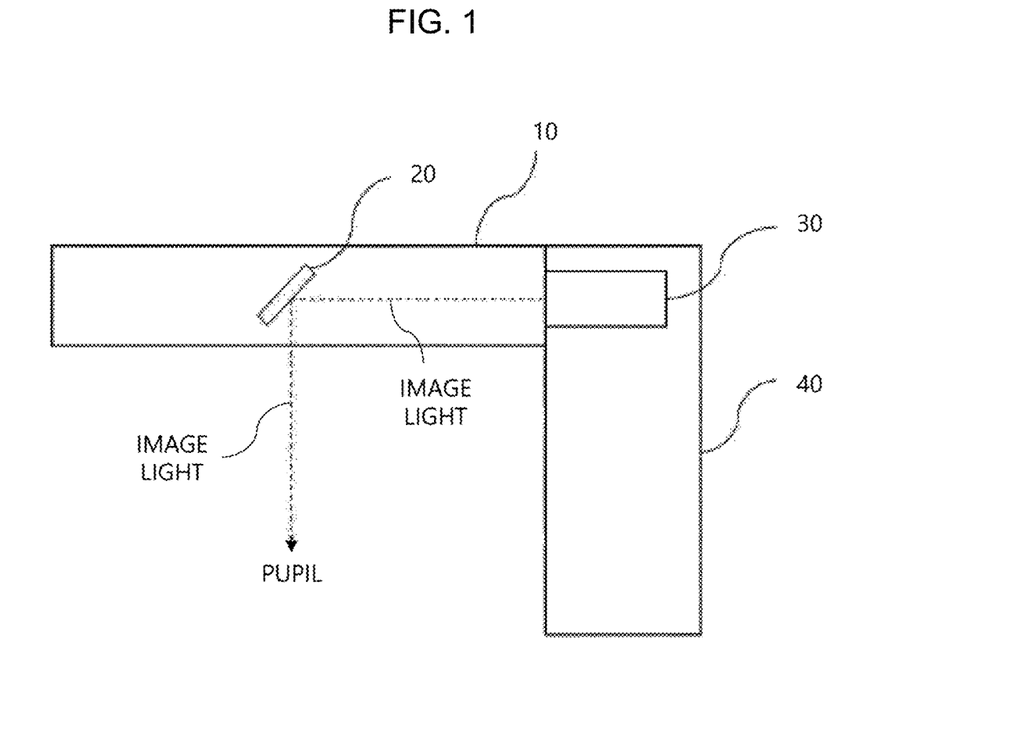
FIG. 1 is a diagram showing an optical device for augmented reality such as that disclosed in patent document 1.

FIG. 1 is a diagram showing an optical device for augmented reality such as that disclosed in patent document 1.

Referring to FIG. 1, an image output unit 30 is a means for outputting image light corresponding to an image for augmented reality, and may be implemented as, e.g., a small-sized display device. A reflective unit 20 provides the image for augmented reality to a user by reflecting image light corresponding to the image for augmented reality, output from the image output unit 30, to the pupil of the user.

An optical means 10 is a means for transmitting at least part of image light output from a real object, therethrough, and may be, e.g., a lens of eyeglasses. The reflective unit 20 is embedded inside the optical means 10. A frame unit 40 is a means for fixing and supporting both the image output unit 30 and the optical means 10.

The reflective unit 20 of FIG. 1 is formed to have a size smaller than the size of the human pupil, i.e., 8 mm or less. By forming the reflective unit 20 to be smaller than the size of the pupil as described above, the depth of field for light entering the pupil through the reflective unit 20 may be made almost infinite, i.e., considerably deep. In this case, the depth of field refers to a range within which an image for augmented reality is recognized as being in focus. When the depth of field get increased, a focal length for an image for augmented reality also get increased. Accordingly, even when a user changes the focal length for the real world while gazing at the real world, an image for augmented reality is always recognized as being in focus regardless of such a change. This may be viewed as a type of pinhole effect. Accordingly, the optical device for augmented reality can always provide a clear virtual image for an image for augmented reality even when a user changes the focal length while gazing at a real object in the real world.

Figure 2:
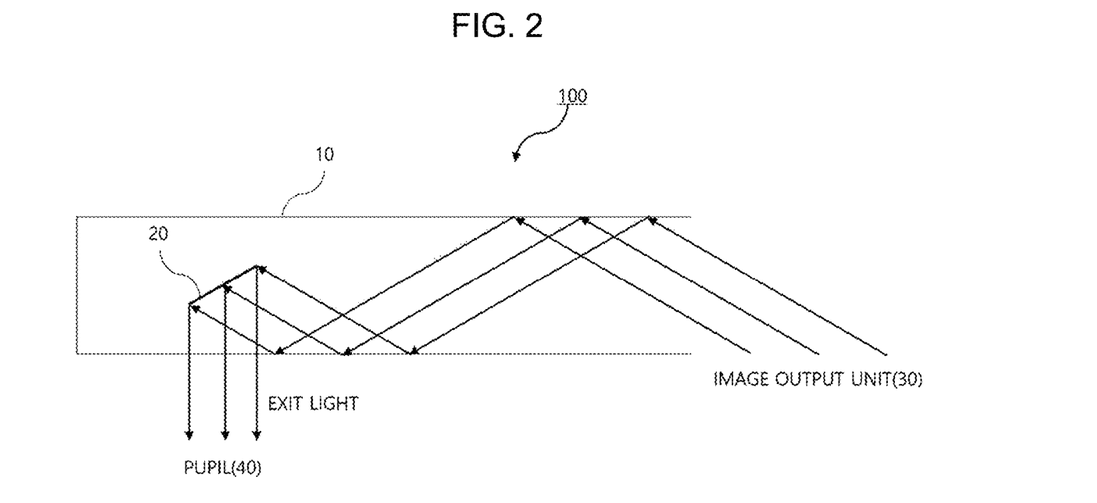
FIG. 2 is a diagram illustrating another example of an optical device for augmented reality developed by the present applicant.

FIG. 2 is a diagram illustrating another example of an optical device for augmented reality developed by the present applicant.

The optical device for augmented reality of FIG. 2 has the same advantages as described with reference to FIG. 1, and is characterized in that image light for augmented reality output from an image output unit 30 is reflected on the inner surface of an optical means 10 and transferred to a reflective unit 20 and the reflective unit 20 reflects off the image light for augmented reality toward the pupil 40, thereby providing an image for augmented reality.

However, the optical device for augmented reality of FIG. 2 has a problem in that an image is appropriately implemented only when the focus of an image for augmented reality is infinite. In other words, rays of image light for augmented reality output from the image output unit 30 have to be, in principle, completely parallel rays of light, as shown in FIG. 2.

Figure 3:
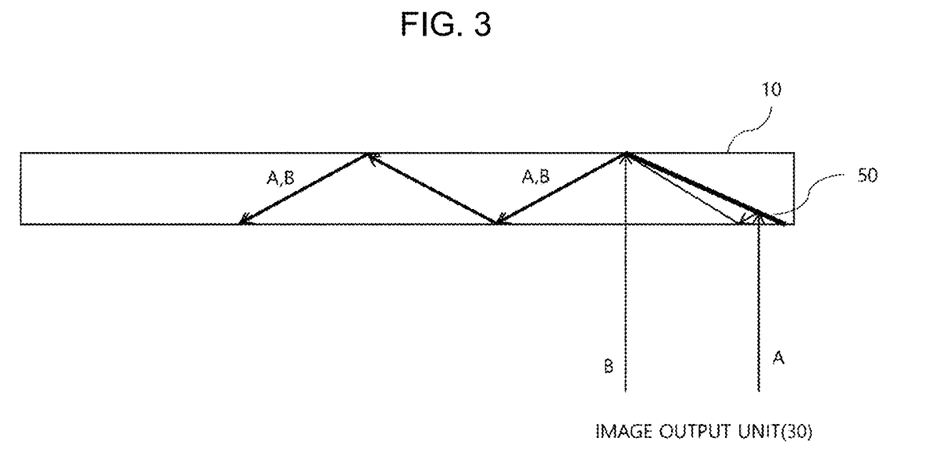
FIGS. 3 and 4 are intended to illustrate the comparison between a case where rays of image light output from an image output unit (30) are parallel rays of light and a case where rays of image light output from the image output unit (30) are not parallel rays of light.
Figure 4:
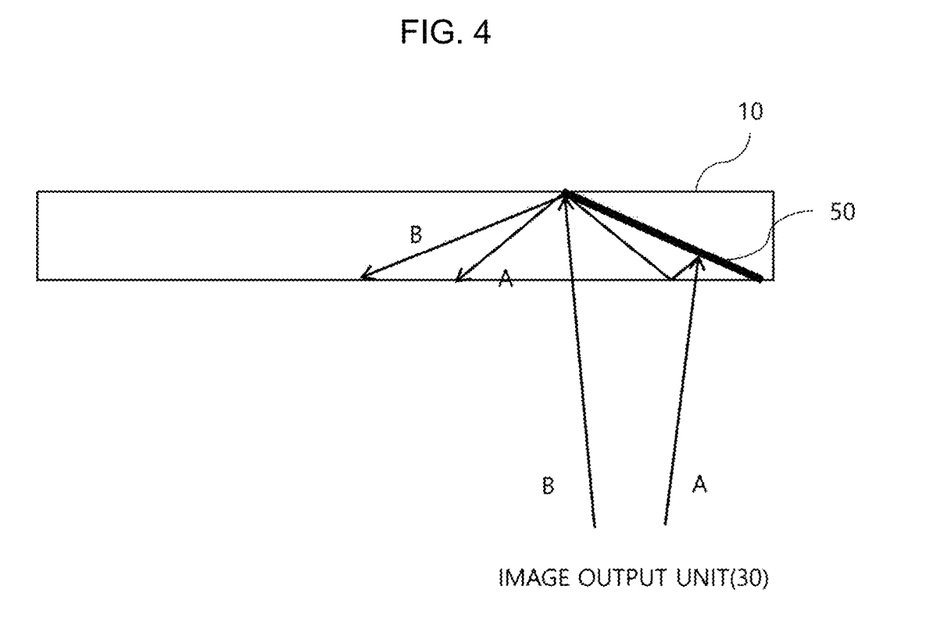

FIGS. 3 and 4 are intended to illustrate the comparison between a case where rays of image light output from the image output unit 30 are parallel rays of light and a case where rays of image light output from the image output unit 30 are not parallel rays of light.

Referring to FIG. 3, rays of image lights A and B corresponding to an image for augmented reality output from the image output unit 30 are parallel rays of light. The rays of image lights A and B are reflected from a reflective mirror 50, and are then reflected by total internal reflection on the inner surface of the optical means 10 and transmitted to the reflective unit 20.

In this case, as shown in FIG. 3, it can be seen that the rays of image light A and B are reflected from the inner surface of the optical means 10 and then superimposed on each other. Accordingly, in this case, when the rays of image light A and B are reflected from the reflective unit 20 and reflected off to the pupil 40, a user can view an appropriately formed image.

Meanwhile, in FIG. 4, the rays of image light A and B output from the image output unit 30 are not parallel rays of light. In this case, the rays of image light A and B are incident on the inner surface of the optical means 10 at different angles through the reflective mirror 50. Accordingly, it can be seen that when the rays of image light A and B are reflected by total internal reflection on the inner surface of the optical means 10, they are reflected by total internal reflection at different angles without being superimposed on each other and then progress, as unlikely in FIG. 3. Accordingly, in the case of FIG. 4, an image formed by the rays of image light transmitted to the pupil 40 through the reflective unit 20 is misaligned or appears broken. In other words, there is a problem in that an image may not be formed appropriately when an image for augmented reality does not have an infinite focus. This means that it is difficult to appropriately implement an image for augmented reality having a close focal length that has a focus other than an infinite focus. This problem is referred to as "optical path length matching problem" or "optical path length adjusting problem". In the case of FIG. 4, optical path length matching is incomplete, resulting in an image breakage phenomenon.

Figure 5:
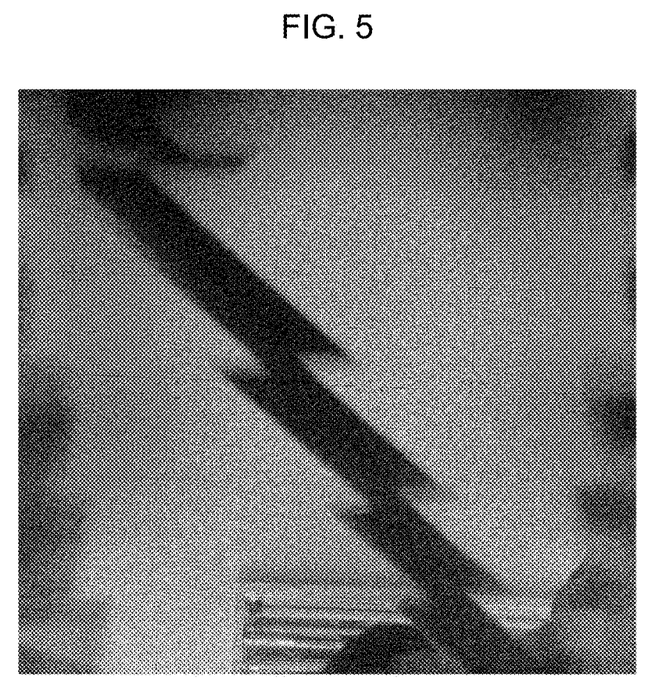
FIGS. 5 to 7 are actual screens showing an image breakage phenomenon.
Figure 6:
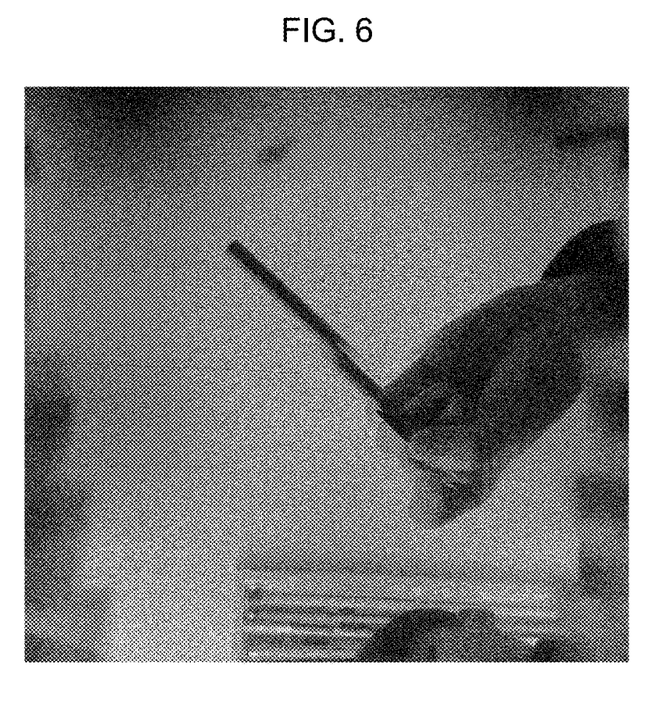
Figure 7:
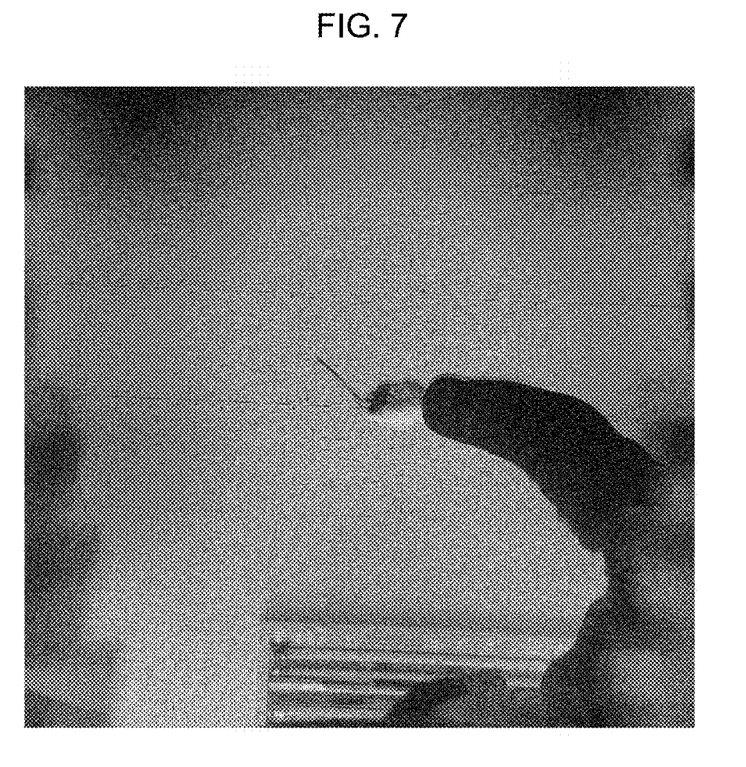

FIGS. 5 to 7 are actual screens showing an image breakage phenomenon.

FIG. 5 corresponds to a case where the rays of image lights A and B output from the image output unit 30 are not completely parallel rays of lights, as described in FIG. 4. From this drawing, it can be seen that an image of a virtual object of a pencil having a close focal length appears broken. The reason for this is that when image light corresponding to the virtual object is transmitted through the optical means 10, images are not naturally connected and are combined in an incomplete state, so that optical path length matching is incomplete. Accordingly, it can be seen that the image of the virtual object of the pencil is provided in the state of being partially broken.

FIG. 6 corresponds to a case in which the focal length is slightly longer than that of FIG. 5, and it can be seen that images of a virtual object are not naturally connected and optical path length matching is also incomplete even in this case.

Meanwhile, FIG. 7 corresponds to a case where the focal length is considerably longer than that of FIG. 6. In this case, the focal length of the virtual object can be viewed as close to infinity. Accordingly, since the rays of image light A and B output from the virtual object are incident as parallel rays of light to the optical means 10 as shown in FIG. 3, it is possible to provide a user with an image without distortion and almost without image breakage. This allows optical path length matching to be viewed as almost perfect.

Figure 8:
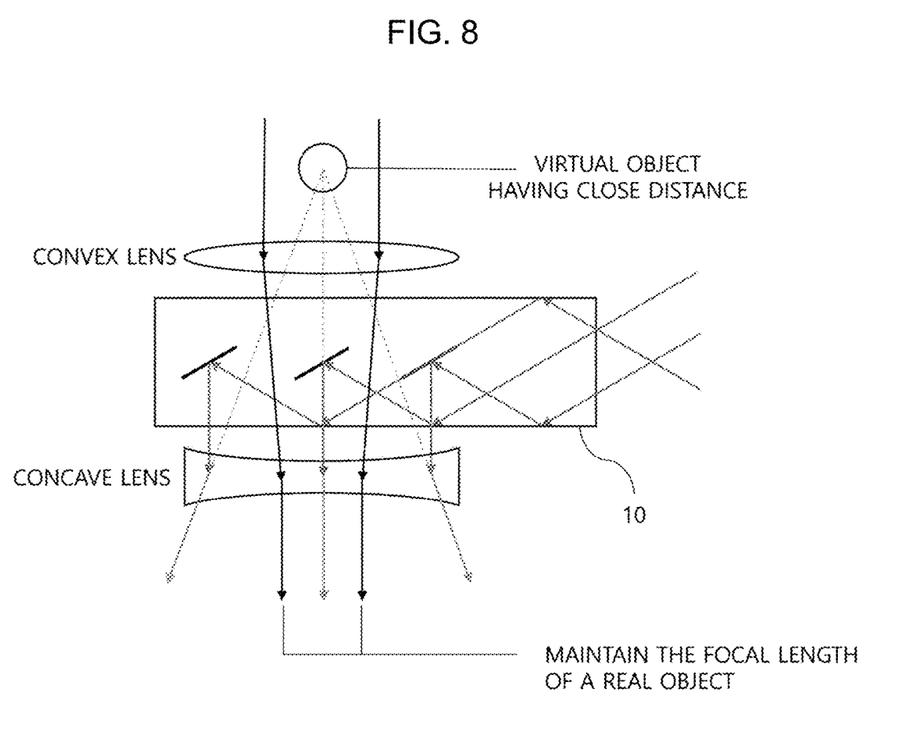
FIG. 8 shows a conventional configuration for displaying an image for augmented reality having a close focal length.

In order to solve this problem, the method shown in FIG. 8 can be taken into consideration.

FIG. 8 shows a conventional configuration for displaying an image for augmented reality having a close focal length. As shown in FIG. 8, a pair of convex and concave lenses are arranged in front and rear of an optical means 10, and, for an image (a virtual object) for augmented reality having a close focal length, image light is reflected by reflective units 20 and is then refracted outward through the concave lens. In this case, if only the concave lens is used, an image of a real object present in the real world recognized by a user through the optical means 10 may be distorted. However, in this case, the image of the real object is refracted inward by the convex lens disposed outside the optical means 10, is incident on the optical means 10, and is then refracted outward through the concave lens. Accordingly, an image of an object present in the real world can be appropriately formed. Therefore, when a configuration such as that shown in FIG. 8 is employed, an image for augmented reality having a close focal length can be appropriately implemented.

However, the configuration such as that shown in FIG. 8 has a problem in that the volume and weight of the device increase because the configuration requires additional components, including the concave and convex lenses, outside the optical means 10.

[Patent document 1] Korean Patent No. 10-1660519 (published on Sep. 29, 2016)

DISCLOSURE

Technical Problem

The present invention has been conceived to overcome the above-described problems, and an object of the present invention is to provide an optical device for augmented reality that can provide a user with a clear image for augmented reality having a close focal length other than an infinite focal length without distortion or breakage.

Technical Solution

In order to accomplish the above object, the present invention provides an optical device for augmented reality capable of providing an image for augmented reality having a close distance, the optical device including: an optical means configured to transmit at least part of image light, output from a real object, therethrough toward the pupil of an eye of a user, and to transfer image light corresponding to an image for augmented reality, output from an image output unit, to at least one optical element by reflecting the image light from the inner surface thereof at least once; and the optical element disposed inside the optical means, and configured to provide the image for augmented reality to the user by transferring the image light, corresponding to the image for augmented reality transmitted through the optical means, toward the pupil of the user; wherein the optical means includes a first surface configured such that the image light output from the real object is incident thereon and a second surface configured such that the image light corresponding to the image for augmented reality transmitted through the optical element is output therethrough, and the first surface and the second surface have an inclination angle ($\theta$) with respect to each other so as not to be parallel to each other.

In this case, the optical element is preferably formed of a reflective means having a size of 8 mm or less.

Furthermore, rays of image light output from any one point of the image output unit are preferably not parallel to each other.

Furthermore, rays of image light output from the image output unit may be reflected by a reflective mirror disposed on the inner surface of the optical means, and may then be reflected by total internal reflection on the first surface and the second surface at least once and transmitted to the optical element.

Furthermore, the inclination angle ($\theta$) may be set based on the focal length (D) of the image for augmented reality which corresponds to the image light corresponding to the image for augmented reality output from the image output unit and an area (S) through which the image light is incident onto the reflective mirror of the optical means from the image output unit.

Furthermore, the inclination angle ($\theta$) is preferably set based on the formula: $\tan^{-1}(S/D)$.

Furthermore, the inclination angle ($\theta$) preferably has a value in the range of 0.015° to 4.6°.

Furthermore, at least a portion of at least any one of the first and second surfaces of the optical means may be formed as a curved surface.

Moreover, the first and second surfaces of the optical means may partially have the inclination angle ($\theta$) with respect to each other.

Advantageous Effects

According to the present invention, there can be provided the optical device for augmented reality that can provide a user with a clear image for augmented reality having a close focal length other than an infinite focal length without distortion or breakage.

BEST MODE

Embodiments of the present invention will be described in detail below with reference to the accompanying drawings.

Figure 9:
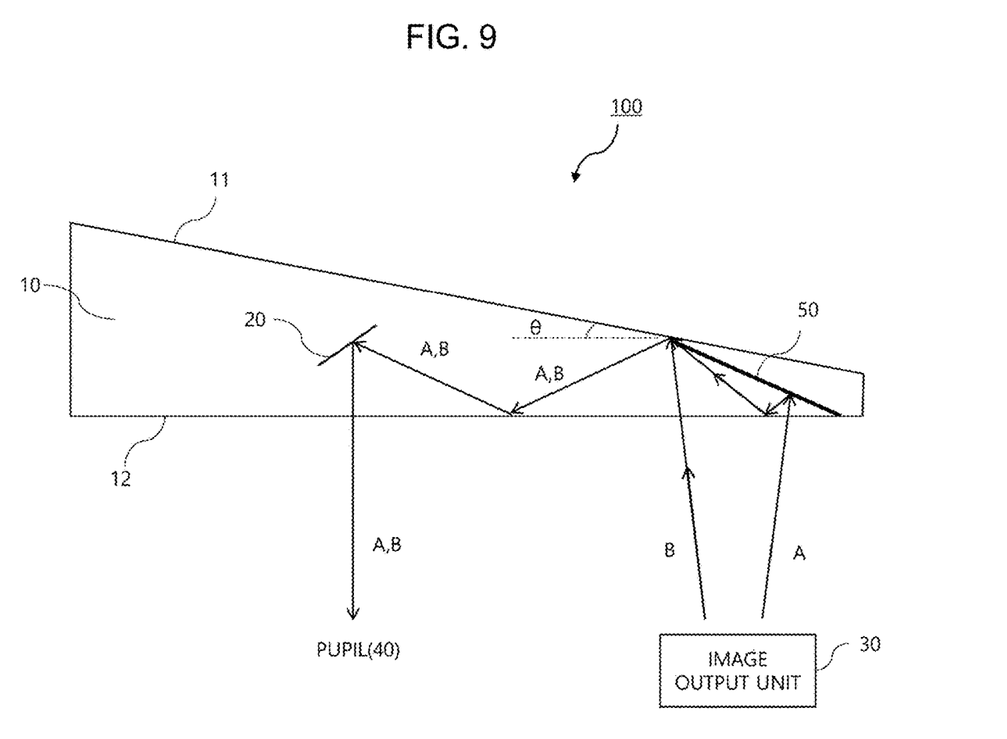
FIG. 9 is a diagram showing the overall configuration of an optical device (100) for augmented reality according to one embodiment of the present invention.

FIG. 9 is a diagram showing the overall configuration of an optical device 100 for augmented reality according to one embodiment of the present invention.

Referring to FIG. 9, the optical device 100 for augmented reality (hereinafter simply referred to as the "optical device 100") according to the present embodiment includes an optical means 10 and an optical element 20.

The optical means 10 is a means for transmitting at least part of image light, output from a real object, therethrough toward the pupil of an eye of a user and transferring image light corresponding to an image for augmented reality, output from an image output unit 30, to an optical element 20 by reflecting the image light from the inner surface thereof at least once.

Furthermore, the optical means 10 includes a first surface 11 configured such that the image light output from the real object is incident thereon and a second surface 12 configured such that the image light corresponding to the image for augmented reality transmitted through the optical element 20 is output therethrough. The first surface 11 and the second surface 12 are arranged to have an inclination angle θ so as not to be parallel to each other.

The optical element 20 is disposed inside the optical means 10, and functions to provide the image for augmented reality to the user by transferring the image light, corresponding to the image for augmented reality transmitted through the optical means 10, toward the pupil 40 of the user.

In other words, the image light output from a real object present in the real world is transmitted to the pupil 40 of the user through the optical means 10, and the image light corresponding to the image light for augmented reality output from the image output unit 30 is transmitted to the pupil 40 of the user by the optical means 10 and the optical element 20. Accordingly, the user may be provided with the image for augmented reality while gazing at the real object.

In this case, the image output unit 30 is a means for outputting image light corresponding to an image for augmented reality toward the optical means 10. For example, the image output unit 30 may be a display device such as a small-sized LCD, or a reflective or refractive means for transferring image light, output from such a display device, toward the optical means 10 by reflecting or refracting the image light.

In other words, the image output unit 30 refers to a display device for displaying an image for augmented reality or various other means such as reflective or refractive means for finally transmitting image light, output from such a display device to the optical means 10. Since the image output unit 30 itself is not a direct target of the present invention and is known in the prior art, a detailed description thereof will be omitted.

Meanwhile, "the image for augmented reality" refers to a virtual image displayed on a display device and transmitted to the pupil 40 of the user through the optical means 10 and the optical element 20, and may be a still image or moving image. The image for augmented reality is provided as a virtual image by being output as image light from the display device and then transferred to the pupil 40 of the user by the optical means 10 and the optical element 20. At the same time, the user directly gazes at image light output from a real object present in the real world through the optical means 10 with his/her eye. As a result, the user is provided with an augmented reality service.

Meanwhile, although only the single optical element 20 is shown in FIG. 9, a plurality of optical elements 20 may be used. When the plurality of optical elements 20 is used, they may be arranged in a line in the horizontal direction in FIG. 9. Alternatively, in FIG. 9, they may be formed in a line in the direction toward the ground, or may be formed in a matrix form based on the combination of the horizontal direction and the direction toward the ground.

Meanwhile, the optical element 20 is preferably formed to have a size smaller than the size of the human pupil, i.e., 8 mm or less, in order to obtain a pinhole effect by increasing the depth of field as described in the background art section.

Furthermore, the optical element 20 may be a reflective means such as a small mirror or a half mirror, or a diffractive means, and is preferably formed of a reflective means having a size smaller than the size of the human pupil, i.e., 8 mm or less.

Meanwhile, a reflective mirror 50 is disposed on the inner surface of the optical means 10. The reflective mirror 50 is a means for reflecting rays of image light A and B, output from the image output unit 30, to the inner surface of the optical means 10 so that the rays of image light A and B can be transmitted to the optical element 20 through total internal reflection.

The reflective mirror 50 is required when the image output unit 30 is disposed as shown in FIG. 9. For example, the reflective mirror 50 may be omitted when the image output unit 30 is disposed at a location where the rays of image light A and B output from the image output unit 30 can be reflected by total internal reflection directly on the inner surface of the optical means 10.

Meanwhile, in FIG. 9, rays of image light output from any one point on the surface of the image output unit 30 are the rays of image light A and B that are not parallel to each other, as described in conjunction with FIG. 4. The rays of image light A and B are reflected by the reflection mirror 50, and are then reflected by total internal reflection on the first and second surfaces 11 and 12 of the optical means 10 at least once and incident on the optical element 20.

In this case, the first and second surfaces 11 and 12 of the optical means 10 are arranged to have an inclination angle $\theta$ so as not to be parallel to each other. Accordingly, the rays of image light A and B are reflected at different angles by total internal reflection on the first surface 11 of the optical means 10, and are superimposed on each other and transmitted to the optical element 20 from a point where the rays of image light A and B first meet each other on the first surface 11 of the optical means 10.

Meanwhile, according to this configuration, the first and second surfaces 11 and 12 are formed to be inclined at the inclination angle $\theta$ with respect to each other, so that an image of the real world incident onto the pupil 40 through the first surface 11 of the optical means 10, i.e., image light output from a real object, may be refracted when passing through the optical means 10, which may influence an image of the real object.

Figure 10:
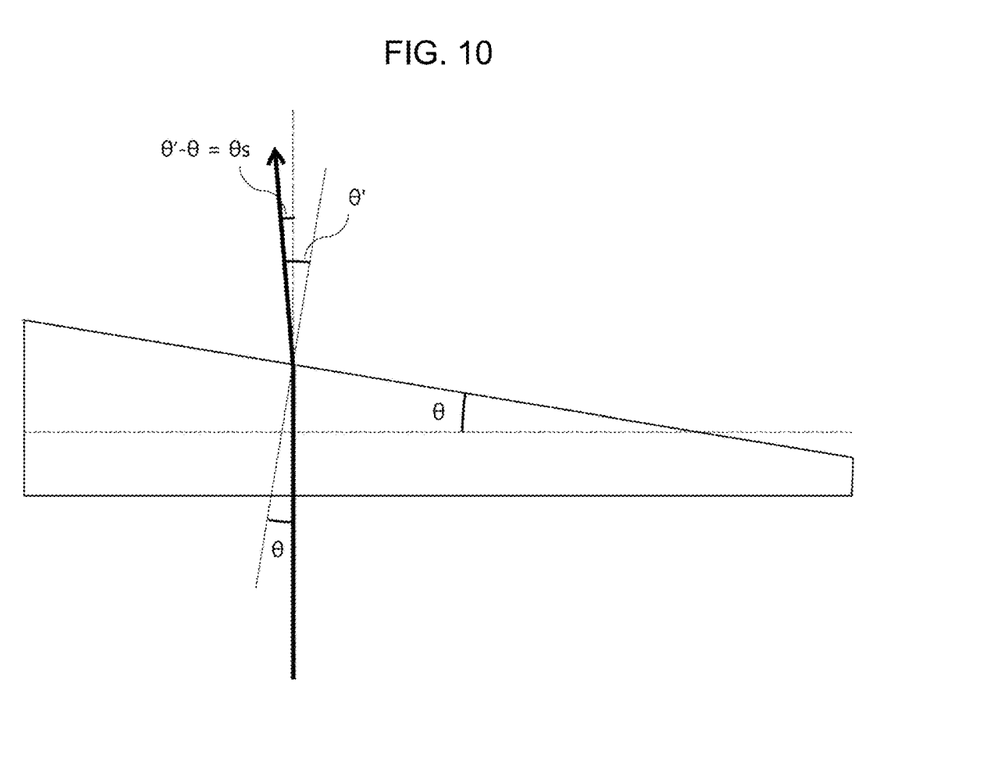
FIGS. 10 and 11 are diagrams illustrating the refraction of image light for a real object by the configuration shown in FIG. 9 and the influence thereof.
Figure 11:
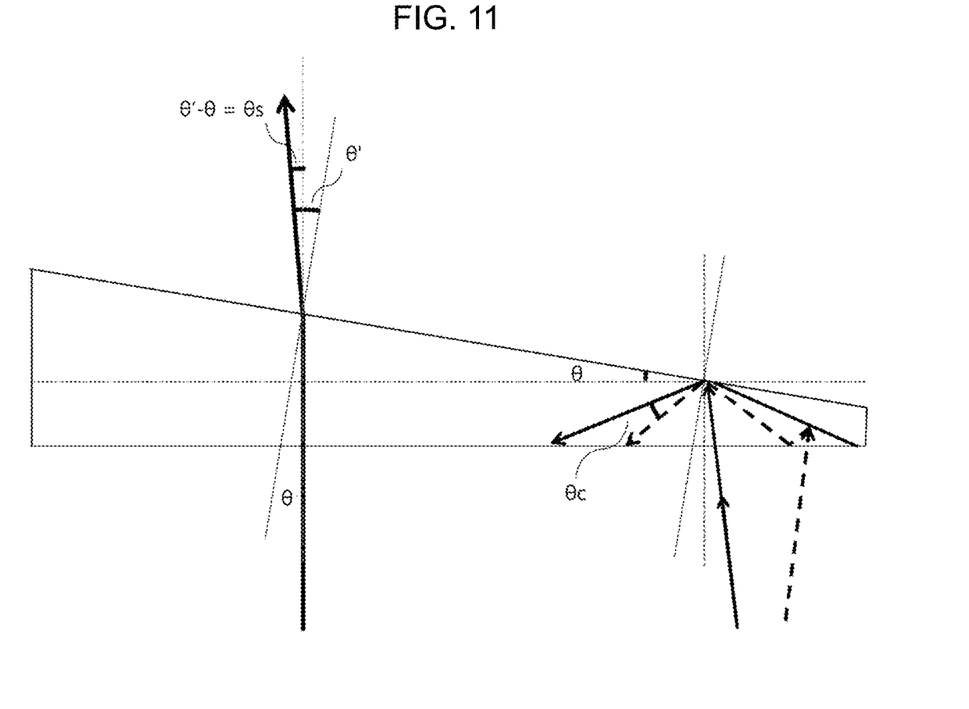

FIGS. 10 and 11 are diagrams illustrating the refraction of image light for a real object by the configuration shown in FIG. 9 and the influence thereof.

Referring to FIG. 10, when the first and second surfaces 11 and 12 are arranged at an inclination angle $\theta$ and the refractive index of the optical means 10 is n, an exit angle $\theta'$ at which image light output from a real object exits after being incident on the optical means 10 and then refracted satisfies the following relationships:

$$n = \frac{\sin\theta'}{\sin\theta}$$

$$n\sin\theta = \sin\theta'$$

$$\sin^{-1}(n\sin\theta) = \theta'$$

Accordingly, the exit angle $\theta_s$ of the image light for a real object with respect to a forward direction from the pupil 40 of the user may be obtained as follows:

$\theta_s = \theta' - \theta = \sin^{-1}(n\sin\theta) - \theta$

In this case, when $\theta$ has a value close to 0, $\sin\theta$ converges to $\theta$, and thus $\sin^{-1}(n\sin\theta)$ may be viewed as $n\theta$. In addition, in the case of the optical means 10 made of glass material, the refractive index n is 1.5, and thus $\theta_s \fallingdotseq \frac{1}{2}\theta$.

This means that when the first and second surfaces 11 and 12 of the optical means 10 are disposed at an inclination angle $\theta$, a real object is refracted only by $\frac{1}{2}\theta$ with respect to the forward direction from the pupil 40.

Meanwhile, referring to FIG. 11, when the non-parallel rays of image light A and B output from the image output unit 30 exit through the second surface 12 of the optical means 10 after being reflected by total internal reflection at a point on the first surface 11 of the optical means 10, it has an inclination angle $\theta_c$, which satisfies the following relationship:

$\theta_c = 2\theta$

As described above, $\theta$ is $2\theta_s$, and thus $\theta_c \fallingdotseq 4\theta_s$.

This means that when the first and second surfaces 11 and 12 of the optical means 10 have an inclination angle $\theta$, the influence on image light corresponding to an image for augmented reality is approximately four times higher than the influence on image light for a real object in the real world. Accordingly, it means that the image matching effect on the image light corresponding to the image for augmented reality is large, but the refraction effect on the image light in the real world is not large.

Figure 12:
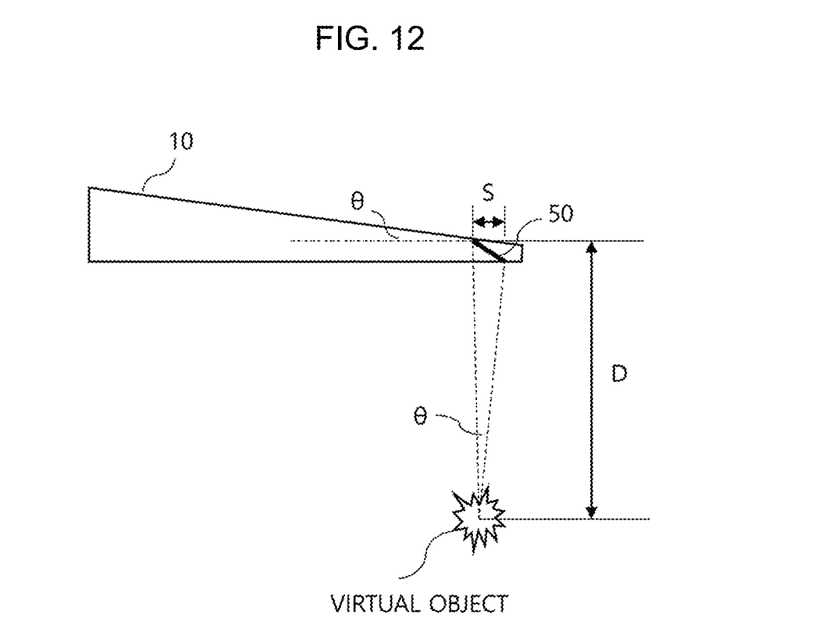
FIG. 12 is a view illustrating the process of setting an inclination angle (θ) between the first and second surfaces (11 and 12) of an optical means (10).

FIG. 12 is a view illustrating the process of setting an inclination angle $\theta$ between the first and second surfaces 11 and 12 of the optical means 10.

Referring to FIG. 12, when it is desired to provide a virtual object (a virtual image) having a relatively short focal length D as an image for augmented reality, the area S through which image light corresponding to the virtual object is incident onto the reflective mirror 50 has the following relationship:

$$\tan\theta \fallingdotseq S/D$$

where $\theta$ is the angle between the paths of the rays of image light incident from the center of the virtual object onto the outermost ends of the reflective mirror 50, which may be set as the inclination angle $\theta$ between the first and second surfaces 11 and 12 of the optical means 10.

Therefore, the inclination angle $\theta$ may be calculated by calculating $\tan^{-1}(S/D)$, and the inclination angle $\theta$ between the first and second surfaces 11 and 12 of the optical means 10 may be set to a value approximate to the result of the calculation.

In other words, this means that the inclination angle $\theta$ between the first and second surfaces 11 and 12 of the optical means 10 may be set based on where the focal length D of the image for augmented reality will be placed.

It is known that the range of the depth of field of the human eye is generally ±0.3 diopters. Accordingly, it is impossible to make the focal length closer than 3,333 mm (=1/0.3) in the above-described conventional structure having an infinite focal length. In addition, it is known that a human can focus only when the focal length is about 125 mm or longer, and cannot focus when it is shorter than about 125 mm. The present invention is characterized in that the image for augmented reality, i.e., the virtual image, is configured to be focused between 3,333 mm and 125 mm by taking into consideration the above-described facts.

Accordingly, the desired minimum and maximum values of the inclination angle $\theta$ may be calculated as follows:

The minimum inclination angle $\theta$ is obtained when S=3,333 mm. D corresponds to the size of the human pupil, and thus it has a value in the range of 1 mm to 10 mm. In the case of the minimum inclination angle $\theta$, D needs to have a minimum value. When D is set to 1 mm, $\tan\theta \fallingdotseq S/D \approx 0.017°$.

The maximum inclination angle $\theta$ is obtained when S=125 mm. D corresponds to the size of the human pupil, and thus it has a value in the range of 1 mm to 10 mm. In the case of the maximum inclination angle $\theta$, D needs to have a maximum value. When D is set to 10 mm, $\tan\theta \fallingdotseq S/D \approx 4.574°$.

Therefore, the inclination angle $\theta$ preferably has a value between 0.017° and 4.574°, and it is sufficient if it falls within the range of about 0.015° to 4.6°.

Figure 13:
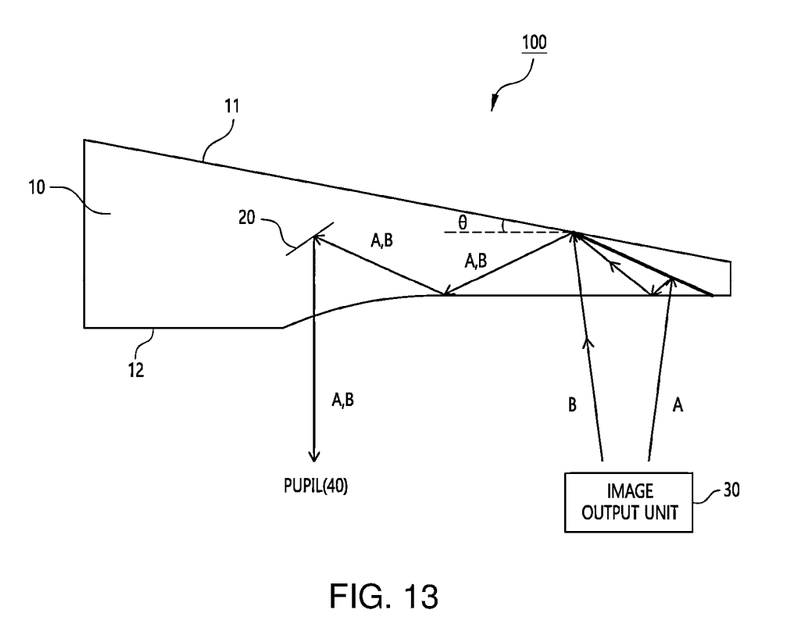
FIG. 13 illustrates that least a portion of at least any one of the first and second surfaces (11 and 12) of the optical means (10) is formed as a curved surface.

Meanwhile, although the first and second surfaces 11 and 12 of the optical means 10 are shown to be flat, at least a portion of at least one of them may be formed as a curved surface.

Furthermore, since the first and second surfaces 11 and 12 of the optical means 10 are both formed as flat surfaces, the first and second surfaces 11 and 12 are entirely inclined with respect to each other at the inclination angle θ. However, the first and second surfaces 11 and 12 may be partially inclined with respect to each other at the inclination angle θ. For example, only the portions of the first and second surfaces 11 and 12 near the pupil 40 may be inclined with respect to each other at the inclination angle θ, and the remaining portions thereof may be parallel to each other.

The optical device 10 for augmented reality according to the present invention, which has been described above, has the effect of providing a user with a virtual object having a close focal length other than an infinite focal length, as illustrated in the case of FIG. 7.

While the present invention has been described above with reference to the preferred embodiments of the present invention, it will be apparent that the present invention is not limited to the above-described embodiments and other various modifications and variations may be possible.

The invention claimed is:

1. An optical device for augmented reality capable of providing an image for augmented reality having a close distance, the optical device comprising:
   an optical means configured to transmit at least part of image light, output from a real object, therethrough toward a pupil of an eye of a user, and to transfer image light corresponding to an image for augmented reality, output from an image output unit, to at least one optical element by reflecting the image light from an inner surface thereof at least once; and
   at least one optical element disposed inside the optical means, and configured to provide the image for augmented reality to the user by transferring the image light, corresponding to the image for augmented reality transmitted through the optical means, toward the pupil of the user;
   wherein the optical means comprises a first surface configured such that the image light output from the real object is incident thereon and a second surface configured such that the image light corresponding to the image for augmented reality transmitted through the optical element is output therethrough, and the first surface and the second surface have an inclination angle (θ) with respect to each other so as not to be parallel to each other;
   wherein rays of image light output from the image output unit are reflected by a reflective mirror disposed on an inner surface of the optical means, and are then reflected by total internal reflection on the first surface and the second surface at least once and transmitted to the optical element; and
   wherein the inclination angle (θ) is set based on a focal length (D) of the image for augmented reality which corresponds to the image light corresponding to the image for augmented reality output from the image output unit and an area (S) through which the image light is incident onto the reflective mirror of the optical means from the image output unit.

2. The optical device of claim 1, wherein the optical element is formed of a reflective means having a size of 8 mm or less.

3. The optical device of claim 1, wherein rays of image light output from any one point of the image output unit are not parallel to each other.

4. The optical device of claim 1, wherein the inclination angle (θ) is set based on a formula: $\tan^{-1}(S/D)$.

5. The optical device of claim 4, wherein the inclination angle (θ) has a value in a range of 0.015° to 4.6°.

6. The optical device of claim 1, wherein at least a portion of at least any one of the first and second surfaces of the optical means is formed as a curved surface.

7. The optical device of claim 1, wherein the first and second surfaces of the optical means partially have the inclination angle (θ) with respect to each other.

* * * * *